United States Patent
Kim et al.

(10) Patent No.: US 11,109,252 B2
(45) Date of Patent: Aug. 31, 2021

(54) METHOD AND APPARATUS FOR ADJUSTING NETWORK CONFIGURATION BASED ON CHANNEL BUSY RATIO IN WIRELESS COMMUNICATION SYSTEM

(71) Applicant: LG Electronics Inc., Seoul (KR)

(72) Inventors: Sangwon Kim, Seoul (KR); Youngdae Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/401,291

(22) Filed: May 2, 2019

(65) Prior Publication Data

US 2019/0342783 A1    Nov. 7, 2019

(30) Foreign Application Priority Data

May 3, 2018    (KR) .......................... 10-2018-0051160

(51) Int. Cl.
| | |
|---|---|
| *H04W 24/10* | (2009.01) |
| *H04W 24/08* | (2009.01) |
| *H04L 12/24* | (2006.01) |
| *H04B 17/318* | (2015.01) |

(52) U.S. Cl.
CPC .......... *H04W 24/10* (2013.01); *H04B 17/318* (2015.01); *H04L 41/0816* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2011/0110254 A1* | 5/2011 | Ji ...................... | H04W 36/0066 370/252 |
| 2016/0227427 A1* | 8/2016 | Vajapeyam ....... | H04W 72/0453 |
| 2017/0127325 A1* | 5/2017 | Vikberg ................ | H04W 36/14 |

* cited by examiner

*Primary Examiner* — Peter Chen
*Assistant Examiner* — Jeff Banthrongsack
(74) *Attorney, Agent, or Firm* — Dentons US LLP

(57) ABSTRACT

A method and apparatus for adjusting a network configuration based on a channel occupancy and/or a channel busy ratio in a wireless communication system is provided. The wireless device performs a received signal strength indicator (RSSI) measurement and/or channel occupancy measurement for an unlicensed frequency. The wireless device may determine a frequency priority of the unlicensed frequency based on a result of the RSSI measurement and/or the channel occupancy measurement. Alternatively, the wireless device may adjust a value of a parameter for measurement reporting, cell selection and/or cell reselection based on the result of the RSSI measurement and/or the channel occupancy measurement.

3 Claims, 8 Drawing Sheets

[FIG. 1]

[FIG. 3]
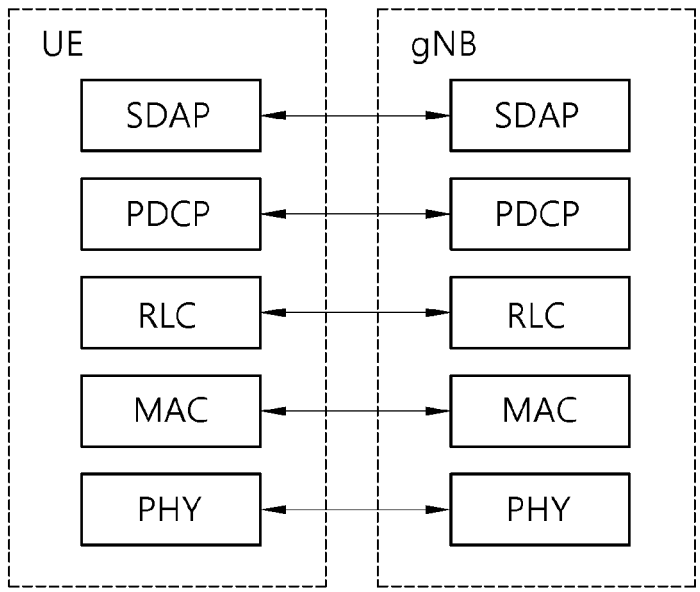
[FIG. 4]
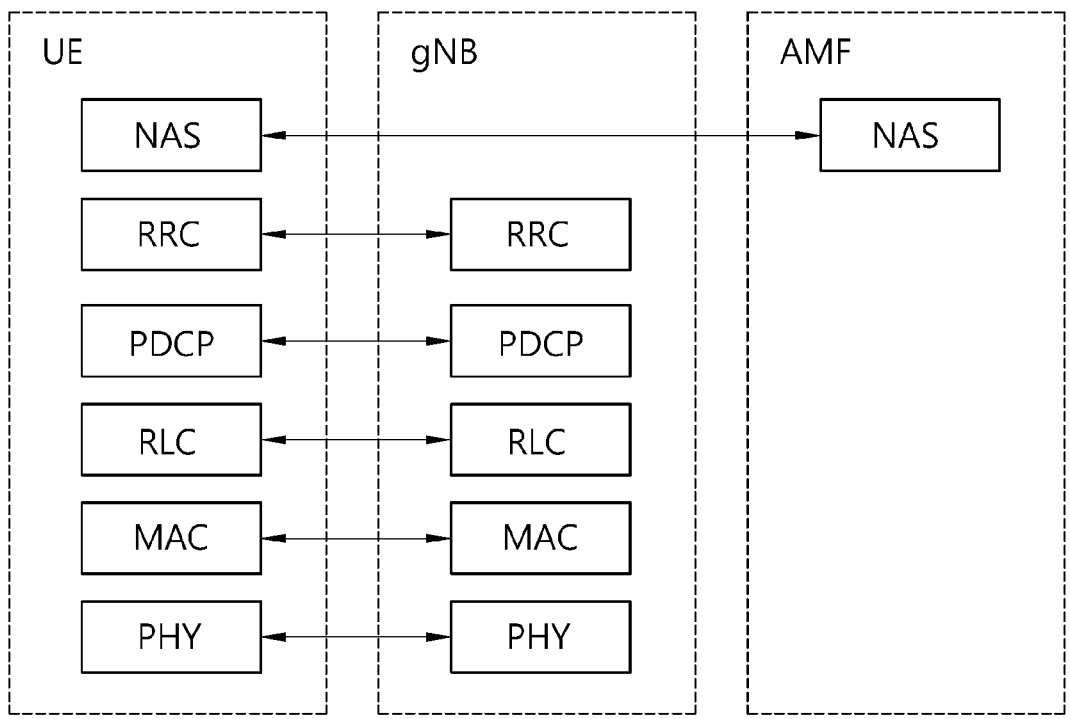

[FIG. 6]
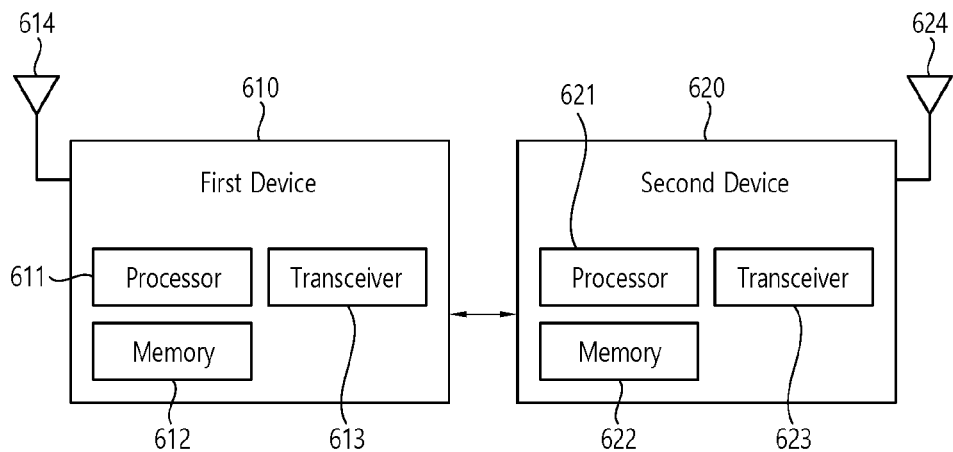
[FIG. 7]
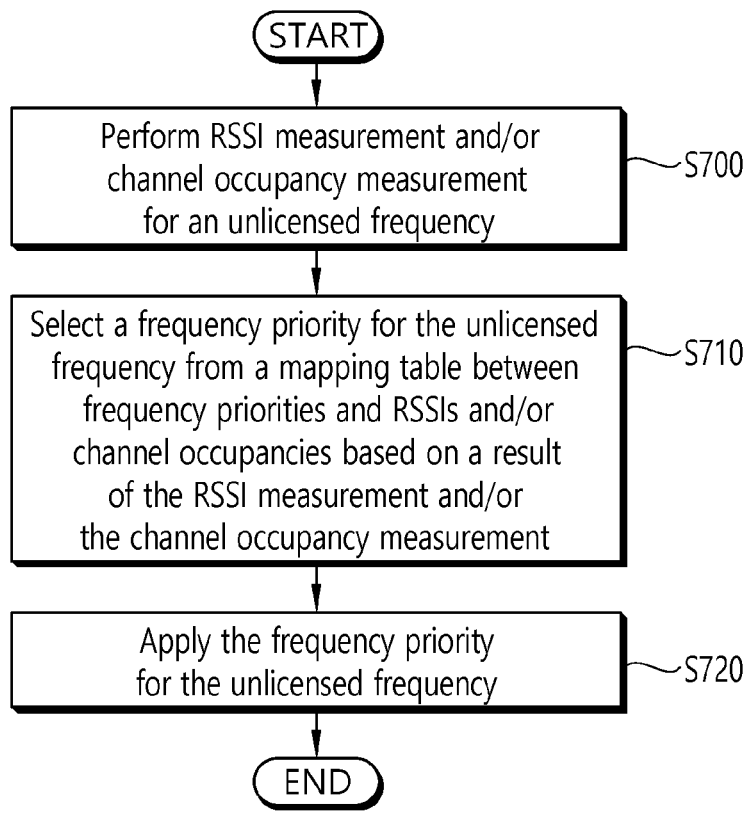

[FIG. 8]
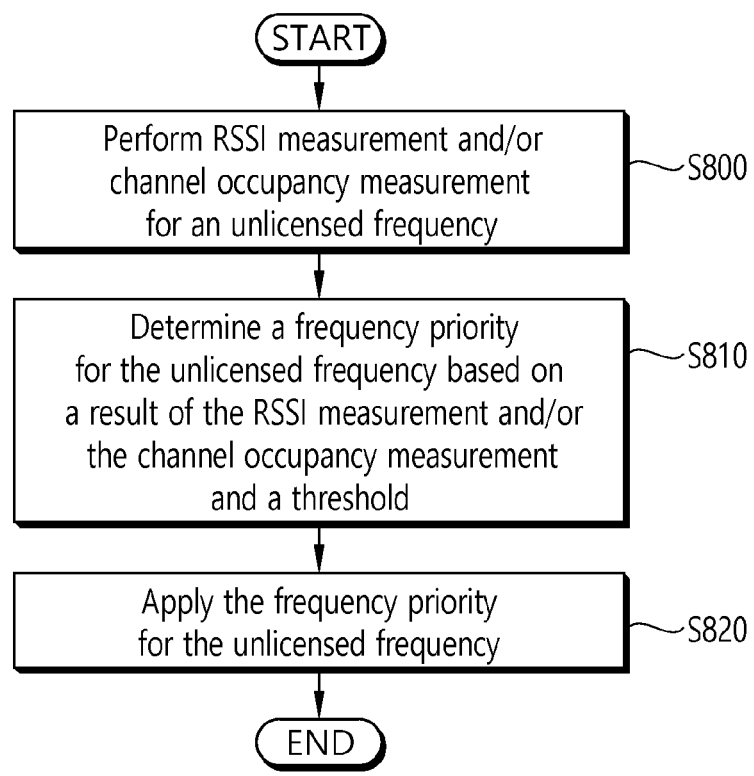

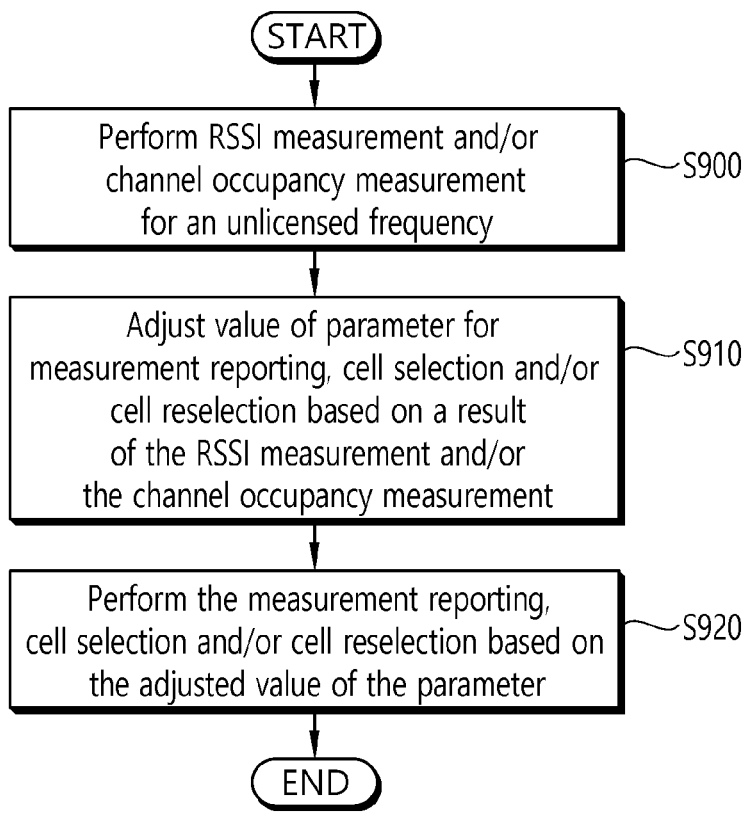
[FIG. 9]

[FIG. 10]
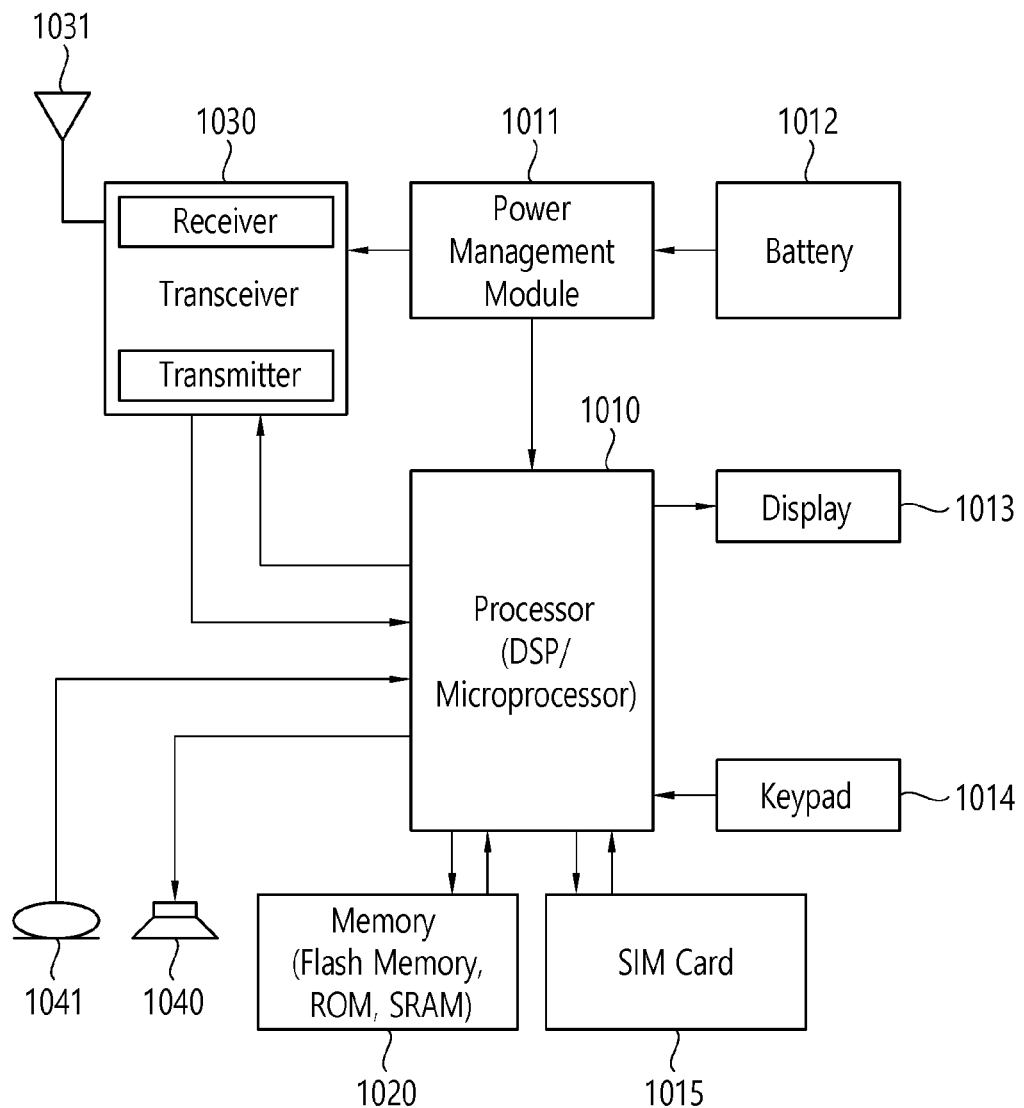

METHOD AND APPARATUS FOR ADJUSTING NETWORK CONFIGURATION BASED ON CHANNEL BUSY RATIO IN WIRELESS COMMUNICATION SYSTEM

CROSS-REFERENCE TO RELATED APPLICATIONS

Pursuant to 35 U.S.C. § 119 (e), this application claims the benefit of Korean Patent Application No. 10-2018-0051160 filed on May 3, 2018, the contents of which are all hereby incorporated by reference herein in their entirety.

BACKGROUND OF THE INVENTION

Field of the Invention

The present invention relates to wireless communications, and more particularly, to a method and apparatus for adjusting a network configuration based on a channel busy ratio in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNodeB (eNB) and user equipment (UE) apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

SUMMARY OF THE INVENTION

NR standalone operation on unlicensed bands is being discussed. Therefore, a method for supporting NR standalone operation on unlicensed bands efficiently is required.

In an aspect, a method performed by a wireless device in a wireless communication system is provided. The method includes performing a received signal strength indicator (RSSI) measurement and/or channel occupancy measurement for an unlicensed frequency, selecting a frequency priority for the unlicensed frequency from a mapping table between frequency priorities and RSSIs and/or channel occupancies based on a result of the RSSI measurement and/or the channel occupancy measurement, and applying the frequency priority for the unlicensed frequency.

In another aspect, a method performed by a wireless device in a wireless communication system is provided. The method includes performing a received signal strength indicator (RSSI) measurement and/or channel occupancy measurement for an unlicensed frequency, determining a frequency priority for the unlicensed frequency based on a result of the RSSI measurement and/or the channel occupancy measurement and a threshold, and applying the frequency priority for the unlicensed frequency.

In another aspect, a method performed by a wireless device in a wireless communication system is provided. The method includes performing a received signal strength indicator (RSSI) measurement and/or channel occupancy measurement for an unlicensed frequency, adjusting a value of a parameter for measurement reporting, cell selection and/or cell reselection based on a result of the RSSI measurement and/or the channel occupancy measurement, and performing the measurement reporting, cell selection and/or cell reselection based on the adjusted value of the parameter.

BRIEF DESCRIPTION OF THE DRAWINGS

FIG. 3 shows a block diagram of a user plane protocol stack to which the technical features of the present invention can be applied.

FIG. 4 shows a block diagram of a control plane protocol stack to which the technical features of the present invention can be applied.

FIG. 6 shows an example of a wireless communication system to which the technical features of the present invention can be applied.

FIG. 7 shows an example of a method for adjusting a network configuration according to an embodiment of the present invention.

FIG. 8 shows an example of a method for adjusting a network configuration according to another embodiment of the present invention.

FIG. 9 shows an example of a method for adjusting a network configuration according to another embodiment of the present invention.

FIG. 10 shows a UE to implement an embodiment of the present invention.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
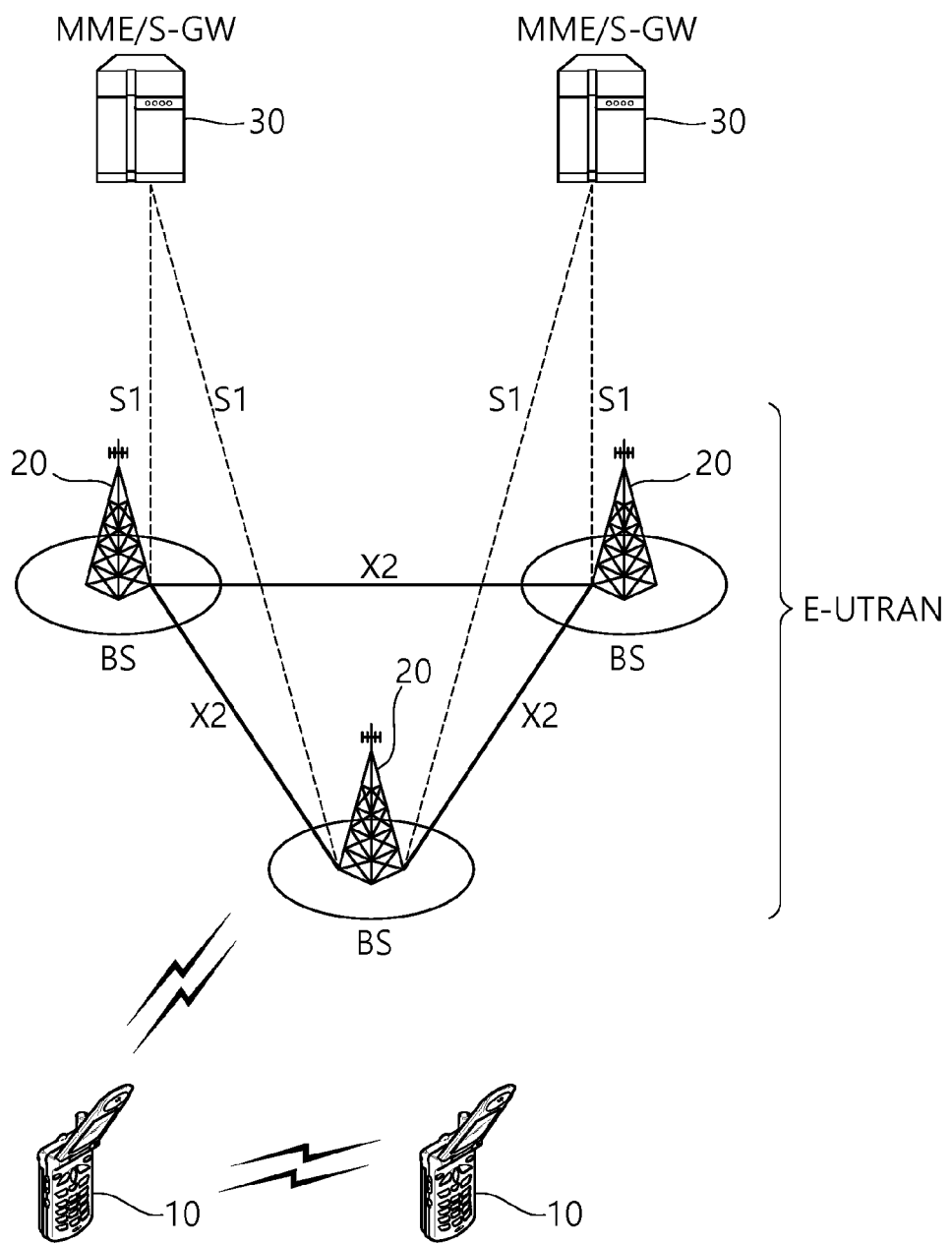
FIG. 1 shows an example of a wireless communication system to which the technical features of the present invention can be applied.

FIG. 1 shows an example of a wireless communication system to which the technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
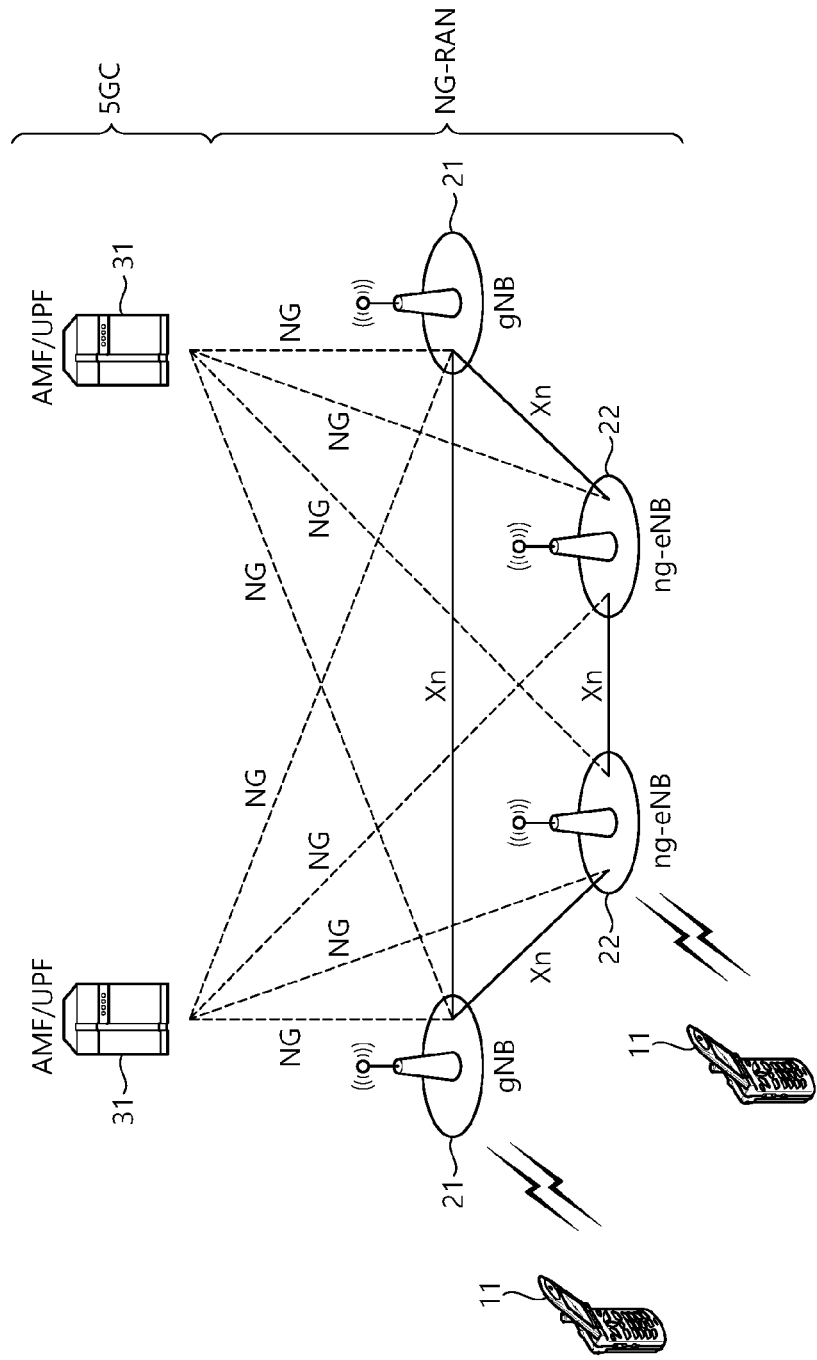
FIG. 2 shows another example of a wireless communication system to which the technical features of the present invention can be applied.

FIG. 2 shows another example of a wireless communication system to which the technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

FIG. 3 shows a block diagram of a user plane protocol stack to which the technical features of the present invention can be applied. FIG. 4 shows a block diagram of a control plane protocol stack to which the technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
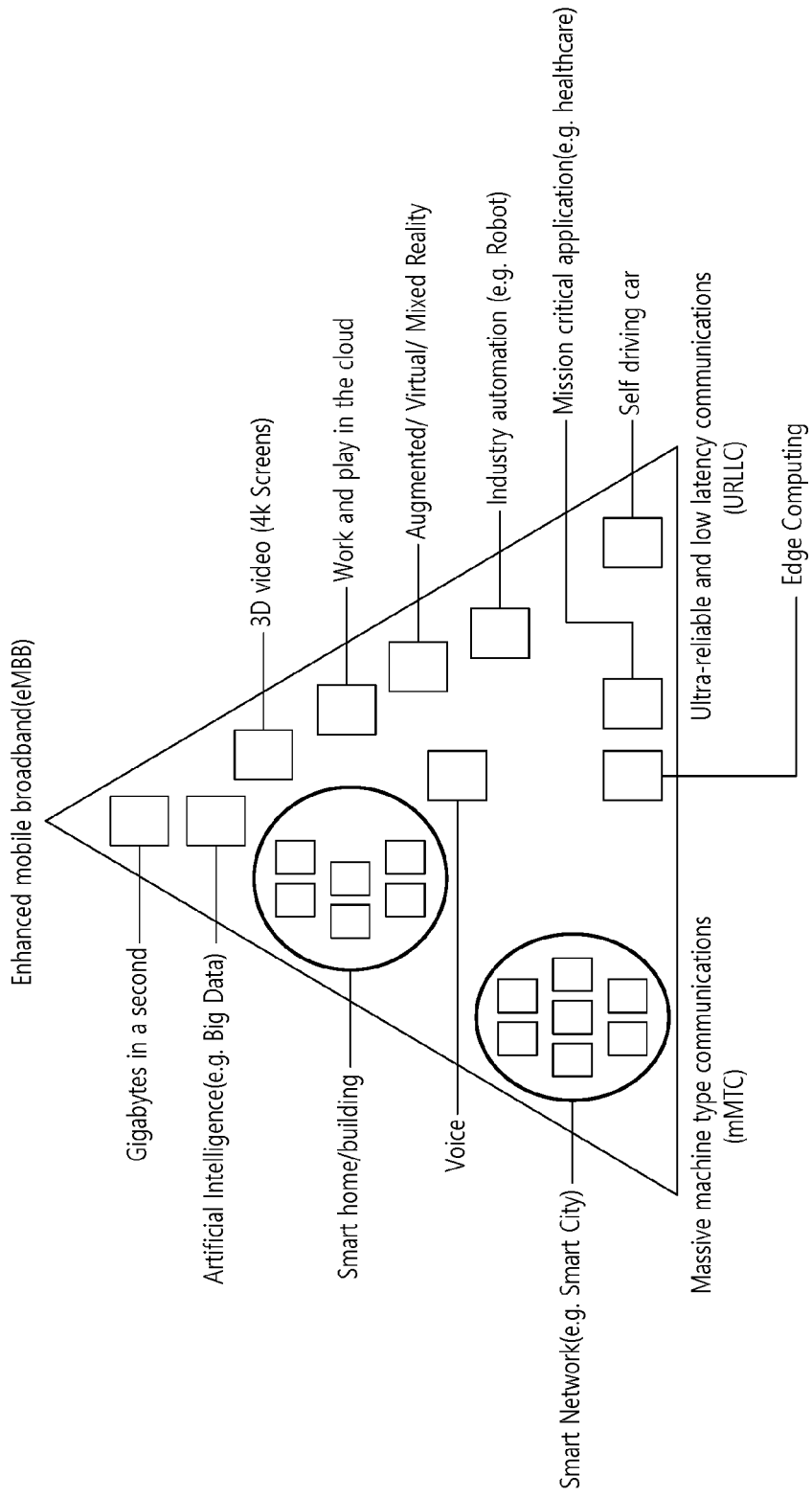
FIG. 5 shows examples of 5G applications to which the technical features of the present invention can be applied.

FIG. 5 shows examples of 5G applications to which the technical features of the present invention can be applied. The 5G applications shown in FIG. 5 are only exemplary, and the technical features of the present invention can be applied to other 5G applications not shown in FIG. 5.

Referring to FIG. 5, the three major usage scenarios defined for 5G include 1) enhanced mobile broadband (eMBB), 2) ultra-reliable and low latency communications (URLLC), and 3) massive machine type communications (mMTC). The eMBB focuses on across-the-board enhancements to the data rate, latency, user density, capacity and coverage of mobile broadband access. The eMBB aims ~10 Gbps of throughput. The URLLC will make it possible for devices and machines to communicate with ultra-reliability, very low latency and high availability, making it ideal for vehicular communication, industrial control, factory automation, remote surgery, smart grids and public safety applications. The URLLC aims ~1 ms of latency. The mMTC is designed to enable communication between devices that are low-cost, massive in number and battery-driven, intended to support applications such as smart metering, logistics, and field and body sensors. The mMTC aims ~10 years on battery and/or ~1 million devices/km$^2$.

Referring to FIG. 5, 5G applications to which the technical features of the present invention can be applied may include, such as transmission gigabytes in a second, artificial intelligence (e.g. big data), smart home/building, smart network (e.g. smart city), voice, 3D video (4 k screens), work and play in the cloud, augmented/virtual/mixed reality, industry automation (e.g. robot), self-driving car, mission critical application (e.g. healthcare), edge computing, etc. Each 5G application may correspond to at least one of the three major usage scenarios described above in some degree. For example, 5G application regarding transmission gigabytes in a second may correspond to eMBB mostly. 5G application regarding self-driving car may correspond to URLLC mostly. 5G application regarding smart network may correspond to mMTC mostly. On the other hand, 5G application regarding augmented/virtual/mixed reality may correspond to both eMBB and URLLC.

FIG. 6 shows an example of a wireless communication system to which the technical features of the present invention can be applied.

Referring to FIG. 6, the wireless communication system may include a first device 610 and a second device 620.

The first device 610 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an internet-of-things (IoT) device, a medical device, a fin-tech device (or, a financial device), a security device, a climate/environmental device, a device related to 5G services, or a device related to the fourth industrial revolution.

The second device 620 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 610 may include at least one or more processors, such as a processor 611, at least one memory, such as a memory 612, and at least one transceiver, such as a transceiver 613. The processor 611 may perform the functions, procedures, and/or methods of the present invention described below. The processor 611 may perform one or more protocols. For example, the processor 611 may perform one or more layers of the air interface protocol. The memory 612 is connected to the processor 611 and may store various types of information and/or instructions. The transceiver 613 is connected to the processor 611 and may be controlled to transmit and receive wireless signals.

The second device 620 may include at least one or more processors, such as a processor 621, at least one memory, such as a memory 622, and at least one transceiver, such as a transceiver 623. The processor 621 may perform the functions, procedures, and/or methods of the present invention described below. The processor 621 may perform one or more protocols. For example, the processor 621 may perform one or more layers of the air interface protocol. The memory 622 is connected to the processor 621 and may store various types of information and/or instructions. The transceiver 623 is connected to the processor 621 and may be controlled to transmit and receive wireless signals.

The memory 612, 622 may be connected internally or externally to the processor 611, 612, or may be connected to other processors via a variety of technologies such as wired or wireless connections.

The first device 610 and/or the second device 620 may have more than one antenna. For example, antenna 614 and/or antenna 624 may be configured to transmit and receive wireless signals.

Cell reselection evaluation process is described. It may be referred to as Section 5.2.4 of 3GPP TS 36.304 V14.6.0 (2018-03).

Reselection priorities handling is described. Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signaling, the UE shall ignore all the priorities provided in system information. If UE is in camped on any cell state, UE shall only apply the priorities provided by system information from current cell, and the UE preserves priorities provided by dedicated signaling and deprioritisationReq received in RRCConnectionReject unless specified otherwise. When the UE in camped normally state, has only dedicated priorities other than for the current frequency, the UE shall consider the current frequency to be the lowest priority frequency (i.e. lower than any of the network configured values). While the UE is camped on a suitable closed subscriber group (CSG) cell in normal coverage, the UE shall always consider the current frequency to be the highest priority frequency (i.e. higher than any of the network configured values), irrespective of any other priority value allocated to this frequency. If the UE capable of sidelink communication is configured to perform sidelink communication and can only perform the sidelink communication while camping on a frequency, the UE may consider that frequency to be the highest priority. If the UE capable of vehicle-to-everything (V2X) sidelink communication is configured to perform V2X sidelink communication and can only perform the V2X sidelink communication while camping on a frequency, the UE may consider that frequency to be the highest priority. If the UE capable of V2X sidelink communication is configured to perform V2X sidelink communication and can only use pre-configuration while not camping on a frequency, the UE may consider the frequency providing inter-carrier V2X sidelink configuration to be the highest priority. If the UE capable of sidelink discovery is configured to perform Public Safety related sidelink discovery and can only perform the Public Safety related sidelink discovery while camping on a frequency, the UE may consider that frequency to be the highest priority.

If the UE is capable either of multimedia broadcast multicast services (MBMS) service continuity or of single-cell point-to-multipoint (SC-PTM) reception and is receiving or interested to receive an MBMS service and can only receive this MBMS service while camping on a frequency on which it is provided, the UE may consider that frequency to be the highest priority during the MBMS session as long as the two following conditions are fulfilled:

1) Either:
   the UE is capable of MBMS service continuity and the reselected cell is broadcasting system information block type-13 (SIB13); or
   the UE is capable of SC-PTM reception and the reselected cell is broadcasting SIB20;
2) Either:
   SIB15 of the serving cell indicates for that frequency one or more MBMS service area identities (SAIs) included and associated with that frequency in the MBMS User Service Description (USD) of this service; or
   SIB15 is not broadcast in the serving cell and that frequency is included in the USD of this service.

If the UE is capable either of MBMS service continuity or of SC-PTM reception and is receiving or interested to receive an MBMS service provided on a downlink only MBMS frequency, on a frequency used by dedicated MBMS cells, on a frequency used by further evolved MBMS (FeMBMS)/unicast-mixed cells, or on a frequency belonging to PLMN different from its registered PLMN, the UE may consider cell reselection candidate frequencies at which it cannot receive the MBMS service to be of the lowest priority during the MBMS session, as long as the above mentioned condition 1) is fulfilled for the cell on the MBMS frequency which the UE monitors or this cell broadcasts SIB1-MBMS and as long as the above mentioned condition 2) is fulfilled for the serving cell.

Example scenarios in which the previous down-prioritisation may be needed concerns the cases where camping is not possible, while the UE can only receive this MBMS frequency when camping on a subset of cell reselection candidate frequencies, e.g. the MBMS frequency is a downlink only carrier, the MBMS frequency is used by dedicated MBMS cells, the MBMS frequency is used by FeMBMS/Unicast-mixed cells, or the MBMS frequency belongs to a PLMN different from UE's registered PLMN.

If the UE is not capable of MBMS service continuity but has knowledge on which frequency an MBMS service of interest is provided, it may consider that frequency to be the highest priority during the MBMS session as long as the reselected cell is broadcasting SIB13.

If the UE is not capable of MBMS service continuity but has knowledge on which downlink only frequency, on which frequency used by dedicated MBMS cells, on which frequency used by FeMBMS/unicast-mixed cells or on which frequency belonging to PLMN different from its registered PLMN an MBMS service of interest is provided, it may consider cell reselection candidate frequencies at which it cannot receive the MBMS service to be of the lowest priority during the MBMS session as long as the cell on the MBMS frequency which the UE monitors is broadcasting SIB13 or SIB1-MBMS.

The UE considers that the MBMS session is ongoing using the session start and end times as provided by upper layers in the USD i.e. the UE does not verify if the session is indicated on MCCH.

In case UE receives RRCConnectionReject with deprioritisationReq, UE shall consider current carrier frequency and stored frequencies due to the previously received RRCConnectionReject with deprioritisationReq or all the frequencies of EUTRA to be the lowest priority frequency (i.e. lower than any of the network configured values) while T325 is running irrespective of camped RAT. The UE shall delete the stored deprioritization request(s) when a PLMN selection is performed on request by NAS.

UE should search for a higher priority layer for cell reselection as soon as possible after the change of priority. The minimum related performance requirements are still applicable.

The UE shall delete priorities provided by dedicated signaling when:
   the UE enters RRC_CONNECTED state; or
   the optional validity time of dedicated priorities (T320) expires; or
   a PLMN selection is performed on request by NAS.

Equal priorities between RATs are not supported.

The UE shall only perform cell reselection evaluation for E-UTRAN frequencies and inter-RAT frequencies that are given in system information and for which the UE has a priority provided.

The UE shall not consider any black listed cells as candidate for cell reselection.

The UE shall inherit the priorities provided by dedicated signaling and the remaining validity time (i.e., T320 in E-UTRA, T322 in UTRA and T3230 in GERAN), if configured, at inter-RAT cell (re)selection.

The network may assign dedicated cell reselection priorities for frequencies not configured by system information.

While T360 is running, redistribution target is considered to be the highest priority (i.e. higher than any of the network configured values). UE shall continue to consider the serving frequency as the highest priority until completion of E-UTRAN Inter-frequency redistribution procedure if triggered on T360 expiry/stop.

Measurement rules for cell re-selection is described. When evaluating Srxlev and Squal of non-serving cells for reselection purposes, the UE shall use parameters provided by the serving cell.

Following rules are used by the UE to limit needed measurements:
   1> If the serving cell fulfils Srxlev>$S_{IntraSearchP}$ and Squal>$S_{IntraSearchQ}$, the UE may choose not to perform intra-frequency measurements.
   1> Otherwise, the UE shall perform intra-frequency measurements.
   1> The UE shall apply the following rules for E-UTRAN inter-frequencies and inter-RAT frequencies which are indicated in system information and for which the UE has priority:
      2> For an E-UTRAN inter-frequency or inter-RAT frequency with a reselection priority higher than the reselection priority of the current E-UTRA frequency the UE shall perform measurements of higher priority E-UTRAN inter-frequency or inter-RAT frequencies.
      2> For an E-UTRAN inter-frequency with an equal or lower reselection priority than the reselection priority of the current E-UTRA frequency and for inter-RAT frequency with lower reselection priority than the reselection priority of the current E-UTRAN frequency:
         3> If the serving cell fulfils Srxlev>$S_{nonIntrasearchP}$ and Squal>$S_{nonIntraSearchQ}$, the UE may choose not to perform measurements of E-UTRAN inter-frequencies or inter-RAT frequency cells of equal or lower priority unless the UE is triggered to measure an E-UTRAN inter-frequency which is configured with redistributionInterFreqInfo.

3> Otherwise, the UE shall perform measurements of E-UTRAN inter-frequencies or inter-RAT frequency cells of equal or lower priority.

1> If the UE supports relaxed monitoring and s-Search-DeltaP is present in SystemInformationBlockType3, the UE may further limit the needed measurements.

Intra-frequency and equal priority inter-frequency cell reselection criteria is described. The cell-ranking criterion $R_s$ for serving cell and $R_n$ for neighbouring cells is defined by Equation 1 below.

$$R_s = Q_{meas,s} + Q_{Hyst} - Q\text{offset}_{temp} + Q\text{offset}_{SCPTM}$$

$$R_n = Q_{meas,n} - Q\text{offset} - Q\text{offset}_{temp} + Q\text{Offset}_{SCPTM} \quad \text{[Equation 1]}$$

In Equation 1, $Q_{meas}$ is reference signal received power (RSRP) measurement quantity used in cell reselections. For intra-frequency: Qoffset equals to Qoffset$_{s,n}$, if Qoffset$_{s,n}$ is valid, otherwise this equals to zero. For inter-frequency, except for narrowband internet-of-things (NB-IoT), Qoffset equals to Qoffset$_{s,n}$ plus Qoffset$_{frequency}$, if Qoffset$_{s,n}$ is valid, otherwise this equals to Qoffset$_{frequency}$. For NB-IoT, Qoffset equals to QoffsetDedicated$_{frequency}$ for any frequency other than the frequency of the dedicated frequency offset, if QoffsetDedicated$_{frequency}$ is valid, otherwise this equals to Qoffset$_{frequency}$ (if QoffsetDedicated$_{frequency}$ is valid Qoffset$_{frequency}$ is not used). Qoffset$_{temp}$ is an offset temporarily applied to a cell. QoffsetSCPTM is an offset temporarily applied to an SC-PTM frequency. The offset is applied to all cells on the SC-PTM frequency. If Qoffset$_{SCPTM}$ is valid, Qoffset for inter-frequency neighbor cells is not used.

If the NB-IoT UE or UE in enhanced coverage is capable of SC-PTM reception and is receiving or interested to receive an MBMS service and can only receive this MBMS service while camping on a frequency on which it is provided (SC-PTM frequency), the UE considers Qoffset$_{SCPTM}$ to be valid during the MBMS session as long as the following condition is fulfilled:

Either:
SIB15 (or SIB15-NB) of the serving cell indicates for that frequency one or more MBMS SAIs included in the MBMS USD of this service; or
SIB15 (or SIB15-NB) is not broadcast in the serving cell and that frequency is included in the USD of this service.

UE should search for a higher ranked cell on another frequency for cell reselection as soon as possible after the UE stops using Qoffset$_{SCPTM}$.

The UE shall perform ranking of all cells that fulfil the cell selection criterion S, but may exclude all CSG cells that are known by the UE not to be CSG member cells.

The cells shall be ranked according to the R criteria specified above, deriving $Q_{meas,n}$ and $Q_{meas,s}$ and calculating the R values using averaged RSRP results.

If a cell is ranked as the best cell, the UE shall perform cell reselection to that cell.

In all cases, the UE shall reselect the new cell, only if the following conditions are met:
the new cell is better ranked than the serving cell during a time interval Treselection$_{RAT}$;
more than 1 second has elapsed since the UE camped on the current serving cell.

When the UE uses infinite dBs for Qoffset$_{SCPTM}$, the UE shall use Qoffset$_{SCPTM}$ zero and rank the cells on the SC-PTM frequency(ies) only first. If the UE cannot find a suitable cell on an SC-PTM frequency, the UE shall rank the cells on all frequencies.

Performing measurements is described. It may be referred to as Section 5.5.3.1 of 3GPP TS 36.304 V14.6.2 (2018-04). For all measurements, except for UE Rx-Tx time difference measurements, received signal strength indicator (RSSI), UL PDCP packet delay per QoS class identifier (QCI) measurement, channel occupancy measurements, channel busy ratio (CBR) measurement, and except for WLAN measurements of band, carrier info, available admission capacity, backhaul bandwidth, channel utilization, and station count, the UE applies the layer 3 filtering, before using the measured results for evaluation of reporting criteria or for measurement reporting.

The UE shall:
1> whenever the UE has a measConfig, perform RSRP and reference signal received quality (RSRQ) measurements for each serving cell as follows:
2> for the PCell, apply the time domain measurement resource restriction in accordance with measSubframePatternPCell, if configured;
2> if the UE supports cell-specific reference signal (CRS) based discovery signals measurement:
3> for each secondary cell (SCell) in deactivated state, apply the discovery signals measurement timing configuration in accordance with measDS-Config, if configured within the measObject corresponding to the frequency of the SCell;
1> if the UE has a measConfig with rs-sinr-Config configured, perform reference signal-signal to noise and interference ratio (RS-SINR) (as indicated in the associated reportConfig) measurements as follows:
2> perform the corresponding measurements on the frequency indicated in the associated measObject using available idle periods or using autonomous gaps as necessary;
1> for each measId included in the measIdList within VarMeasConfig:
2> if the purpose for the associated reportConfig is set to reportCGI:
3> if si-RequestForHO is configured for the associated reportConfig:
4> perform the corresponding measurements on the frequency and RAT indicated in the associated measObject using autonomous gaps as necessary;
3> else:
4> perform the corresponding measurements on the frequency and RAT indicated in the associated measObject using available idle periods or using autonomous gaps as necessary;
3> try to acquire the global cell identity of the cell indicated by the cellForWhichToReportCGI in the associated measObject by acquiring the relevant system information from the concerned cell;
3> if an entry in the cellAccessRelatedInfoList includes the selected PLMN, acquire the relevant system information from the concerned cell;
3> if the cell indicated by the cellForWhichToReportCGI included in the associated measObject is an E-UTRAN cell:
4> try to acquire the CSG identity, if the CSG identity is broadcast in the concerned cell;
4> try to acquire the trackingAreaCode in the concerned cell;
4> try to acquire the list of additional PLMN Identities, as included in the plmn-IdentityList, if multiple PLMN identities are broadcast in the concerned cell;

4> if cellAccessRelatedInfoList is included, use trackingAreaCode and plmn-IdentityList from the entry of cellAccessRelatedInfoList containing the selected PLMN;
4> if the includeMultiBandInfo is configured:
5> try to acquire the freqBandIndicator in the SystemInformationBlockType1 of the concerned cell;
5> try to acquire the list of additional frequency band indicators, as included in the multiBandInfoList, if multiple frequency band indicators are included in the SystemInformationBlockType1 of the concerned cell;
5> try to acquire the freqBandIndicatorPriority, if the freqBandIndicatorPriority is included in the SystemInformationBlockType1 of the concerned cell;
3> if the cell indicated by the cellForWhichToReportCGI included in the associated measObject is a UTRAN cell:
4> try to acquire the location area code (LAC), the routing area code (RAC) and the list of additional PLMN Identities, if multiple PLMN identities are broadcast in the concerned cell;
4> try to acquire the CSG identity, if the CSG identity is broadcast in the concerned cell;
3> if the cell indicated by the cellForWhichToReportCGI included in the associated measObject is a GERAN cell:
4> try to acquire the RAC in the concerned cell;
3> if the cell indicated by the cellForWhichToReportCGI included in the associated measObject is a CDMA2000 cell and the cdma2000-Type included in the measObject is typeHRPD:
4> try to acquire the Sector ID in the concerned cell;
3> if the cell indicated by the cellForWhichToReportCGI included in the associated measObject is a CDMA2000 cell and the cdma2000-Type included in the measObject is type1xRTT:
4> try to acquire the BASE ID, SID and NID in the concerned cell;
2> if the ul-DelayConfig is configured for the associated reportConfig:
3> ignore the measObject;
3> configure the PDCP layer to perform UL PDCP packet delay per QCI measurement;
2> else:
3> if a measurement gap configuration is setup; or
3> if the UE does not require measurement gaps to perform the concerned measurements:
4> if s-Measure is not configured; or
4> if s-Measure is configured and the PCell RSRP, after layer 3 filtering, is lower than this value; or
4> if the associated measObject concerns NR; or
4> if measDS-Config is configured in the associated meas Object:
5> if the UE supports channel state information reference signal (CSI-RS) based discovery signals measurement; and
5> if the eventId in the associated reportConfig is set to eventC1 or eventC2, or if reportStrongestCSI-RSs is included in the associated reportConfig:
6> perform the corresponding measurements of CSI-RS resources on the frequency indicated in the concerned measObject, applying the discovery signals measurement timing configuration in accordance with measDS-Config in the concerned measObject;
6> if reportCRS-Meas is included in the associated reportConfig, perform the corresponding measurements of neighbouring cells on the frequencies indicated in the concerned measObject as follows:
7> for neighbouring cells on the primary frequency, apply the time domain measurement resource restriction in accordance with measSubframePatternConfigNeigh, if configured in the concerned meas Object;
7> apply the discovery signals measurement timing configuration in accordance with measDS-Config in the concerned meas Object;
5> else:
6> perform the corresponding measurements of neighbouring cells on the frequencies and RATs indicated in the concerned measObject as follows:
7> for neighbouring cells on the primary frequency, apply the time domain measurement resource restriction in accordance with measSubframePatternConfigNeigh, if configured in the concerned meas Object;
7> if the UE supports CRS based discovery signals measurement, apply the discovery signals measurement timing configuration in accordance with measDS-Config, if configured in the concerned meas Object;
4> if the ue-RxTxTimeDiffPeriodical is configured in the associated reportConfig:
5> perform the UE Rx-Tx time difference measurements on the PCell;
4> if the reportSSTD-Meas is set to true or pSCell in the associated reportConfig:
5> perform SSTD measurements between the PCell and the primary SCell (PSCell);
4> if the measRSSI-ReportConfig is configured in the associated reportConfig:
5> perform the RSSI and channel occupancy measurements on the frequency indicated in the associated measObject;
2> perform the evaluation of reporting criteria;
The UE capable of CBR measurement when configured to transmit non-pedestrian-to-everything (P2X) related V2X sidelink communication shall:
1> if in coverage on the frequency used for V2X sidelink communication transmission; or
1> if the concerned frequency is included in v2x-InterFreqInfoList in RRCConnectionReconfiguration or in v2x-InterFreqInfoList within SystemInformationBlockType21:
2> if the UE is in RRC_IDLE:
3> if the concerned frequency is the camped frequency:
4> perform CBR measurement on the pools in v2x-CommTxPoolNormalCommon and v2x-CommTxPoolExceptional if included in SystemInformationBlockType21;
3> else if v2x-CommTxPoolNormal or v2x-CommTxPoolExceptional is included in v2x-InterFreqInfoList for the concerned frequency within SystemInformationBlockType21:
4> perform CBR measurement on pools in v2x-CommTxPoolNormal and v2x-CommTxPoolExceptional in v2x-InterFreqInfoList for the concerned frequency in SystemInformationBlockType21;
3> else if the concerned frequency broadcasts SystemInformationBlockType21:
4> perform CBR measurement on pools in v2x-CommTxPoolNormalCommon and v2x-CommTxPoolExceptional if included in SystemInformationBlockType21 broadcast on the concerned frequency;
2> if the UE is in RRC_CONNECTED:
3> if tx-ResourcePoolToAddList is included in VarMeasConfig:
4> perform CBR measurements on each resource pool indicated in tx-ResourcePoolToAddList;
3> if the concerned frequency is the PCell's frequency:
4> perform CBR measurement on the pools in v2x-CommTxPoolNormalDedicated or v2x-SchedulingPool if included in RRCConnectionReconfiguration, v2x-CommTxPoolExceptional if included in SystemInformation-BlockType21 for the concerned frequency and v2x-CommTxPoolExceptional if included in mobilityControlInfoV2X;

3> else if v2x-CommTxPoolNormal, v2x-SchedulingPool or v2x-CommTxPoolExceptional is included in v2x-InterFreqInfoList for the concerned frequency within RRCConnectionReconfiguration:

4> perform CBR measurement on pools in v2x-CommTxPoolNormal, v2x-SchedulingPool, and v2x-CommTxPoolExceptional if included in v2x-InterFreqInfoList for the concerned frequency in RRCConnectionReconfiguration;

3> else if the concerned frequency broadcasts SystemInformationBlockType21:

4> perform CBR measurement on pools in v2x-CommTxPoolNormalCommon and v2x-CommTxPoolExceptional if included in SystemInformationBlockType21 for the concerned frequency;

1> else:

2> perform CBR measurement on pools in v2x-CommTxPoolList in SL-V2X-Preconfiguration for the concerned frequency;

The s-Measure defines when the UE is required to perform measurements. The UE is however allowed to perform measurements also when the PCell RSRP exceeds s-Measure, e.g., to measure cells broadcasting a CSG identity following use of the autonomous search function.

The UE may not perform the WLAN measurements it is configured with e.g. due to connection to another WLAN based on user preferences or due to turning off WLAN.

Hereinafter, various aspects of supporting an operation on unlicensed frequency/band/spectrum for NR are described according to embodiments of the present invention.

(1) Priority Handling: Embodiment 1

FIG. 7 shows an example of a method for adjusting a network configuration according to an embodiment of the present invention.

In step S700, the UE performs RSSI measurement and/or channel occupancy measurement for an unlicensed frequency.

In step S710, the UE selects a frequency priority for the unlicensed frequency from a mapping table between frequency priorities and RSSIs and/or channel occupancies based on a result of the RSSI measurement and/or the channel occupancy measurement.

In step S720, the UE applies the frequency priority for the unlicensed frequency.

The UE may receive information on the mapping table between frequency priorities and RSSIs and/or channel occupancies from a network. The UE may select frequency priority which corresponds to the measurement results of RSSI and/or channel occupancy based on the mapping table between frequency priorities and RSSIs and/or channel occupancy measurement. The frequency priority may be selected/applied from the mapping table regardless of a frequency priority configured by a network.

Table 1 shows an example of a mapping table between frequency priorities and RSSIs.

TABLE 1

| RSSI range | Frequency priority |
|---|---|
| Above 150 dBm | 0 |
| 50 dBm~150 dBm | 1 |

TABLE 1-continued

| RSSI range | Frequency priority |
|---|---|
| −100 dBm~50 dBm | 2 |
| Below −100 dBm | 3 |

Referring to Table 1, when the UE receives the information on the mapping table according to Table 1 from the network, and if the RSSI measurement result of the unlicensed frequency is 80 dBm, the UE considers the priority of the unlicensed frequency as '1'. This frequency priority may be selected/applied regardless of the frequency priority configured by network.

Table 2 shows an example of a mapping table between frequency priorities and channel occupancy.

TABLE 2

| channel occupancy | Frequency priority |
|---|---|
| Above 50% | 1 |
| 10%~50% | 2 |
| Below 10% | 3 |

Referring to Table 2, when the UE receives the information on the mapping table according to Table 2 from the network, and if the channel occupancy measurement result of the unlicensed frequency is 5%, the UE considers the priority of the unlicensed frequency as '3'. This frequency priority may be selected/applied regardless of the frequency priority configured by network.

The UE may decide whether to measure the unlicensed frequency based on the frequency priority, and may perform a cell re-selection procedure.

According to embodiment of the present invention shown in FIG. 7, if an unlicensed frequency is busy, the UE can deprioritize the unlicensed frequency autonomously when the UE performs neighbor cell measurements or cell selection/re-selection. Considering that the channel occupancy can be changed very dynamically, it may be impossible that network re-configures the frequency priority using broadcast signaling whenever it changes. By adjusting network configuration autonomously by the UE, an operation on unlicensed frequency/band/spectrum for NR can be supported efficiently.

(2) Priority Handling: Embodiment 2

FIG. 8 shows an example of a method for adjusting a network configuration according to another embodiment of the present invention.

In step S800, the UE performs RSSI measurement and/or channel occupancy measurement for an unlicensed frequency.

In step S810, the UE determines a frequency priority for the unlicensed frequency based on a result of the RSSI measurement and/or the channel occupancy measurement and a threshold.

In step S820, the UE applies the frequency priority for the unlicensed frequency.

For example, if the measurement result of RSSI and/or channel occupancy is higher than threshold 1, the UE may consider the frequency to be the lowest priority frequency (i.e. lower than any of the frequency priority configured by the network). Or, if the measurement result of RSSI and/or channel occupancy is lower than threshold 2, the UE considers the frequency to be the highest priority frequency (i.e. higher than any of the frequency priority configured by the network).

The UE may decide whether to measure the unlicensed frequency based on the frequency priority, and may perform a cell re-selection procedure.

According to embodiment of the present invention shown in FIG. 8, if an unlicensed frequency is busy, the UE can deprioritize the unlicensed frequency autonomously when the UE performs neighbor cell measurements or cell selection/re-selection. Considering that the channel occupancy can be changed very dynamically, it may be impossible that network re-configures the frequency priority using broadcast signaling whenever it changes. By adjusting network configuration autonomously by the UE, an operation on unlicensed frequency/band/spectrum for NR can be supported efficiently.

(3) Parameter Scaling

FIG. 9 shows an example of a method for adjusting a network configuration according to another embodiment of the present invention.

In step S900, the UE performs RSSI measurement and/or channel occupancy measurement for an unlicensed frequency.

In step S910, the UE adjusts value of parameter for measurement reporting, cell selection and/or cell reselection based on a result of the RSSI measurement and/or the channel occupancy measurement. The UE may adjust the value of the following parameters configured by network based on the measurement results of RSSI and/or channel occupancy of serving cell's frequency or target cell's frequency: TimeToTrigger (TTT), Treselection or frequency offset. TimeToTrigger specifies the value range used for time to trigger parameter, which concerns the time during which specific criteria for the event needs to be met in order to trigger a measurement report. Treselection specifies the cell reselection timer value.

- If the measurement results of RSSI is higher than RSSI threshold1, or if the measurement results of channel occupancy is higher than channel occupancy threshold1, UE may use the TimeToTrigger value multiplied by SF1-TTT, Treselection value multiplied by SF1-Treselection and/or frequency offset value multiplied by SF1-offset.
- If the measurement results of RSSI is higher than RSSI threshold2 and is lower than RSSI threshold1, or if the measurement results of channel occupancy is higher than channel occupancy threshold2 and lower than channel occupancy threshold1, UE may use the TimeToTrigger value multiplied by SF2-TTT, Treselection value multiplied by SF2-Treselection and/or frequency offset value multiplied by SF2-offset.
- If the measurement results of RSSI is lower than RSSI threshold2, or if the measurement results of channel occupancy is lower than channel occupancy threshold2, UE may use the TimeToTrigger value multiplied by SF3-TTT, Treselection value multiplied by SF3-Treselection and/or frequency offset value multiplied by SF3-offset.

For example, scaling of frequency offset based on the measurement result of channel occupancy may be as follows. The cell-ranking criterion $R_s$ for serving cell and $R_n$ for neighbor cells operated on unlicensed frequency may be defined by Equation 2 below.

$$R_s = Q_{meas,s} + Q_{Hyst} - Qoffset_{temp} + Qoffset_{SCTPM} - Qoffset_{unlicensed}$$

$$R_n = Q_{meas,n} + Qoffset - Qoffset_{temp} + Qoffset_{SCTPM} - Qoffset_{unlicensed}$$
[Equation 2]

It may be assumed that serving cell and neighbor cell 1 are operated on unlicensed frequency while neighbour cell 2 is operated on licensed frequency. It may also assumed that the channel occupancy of the unlicensed frequency for the serving cell is 60% and the channel occupancy of the unlicensed frequency for the neighbor cell 1 is 30%. When the scaling factor corresponding to 60% and 30% of channel occupancy are 0.8 and 0.3, respectively, ranking of each cell may be calculated by Equation 3 below.

$$Rs(\text{serving cell}) = Q_{meas,s} + Q_{Hyst} - Qoffset_{temp} + Qoffset_{SCTPM} - Qoffset_{unlicensed} * 0.8$$

$$Rn1(\text{neighbour cell1}) = Q_{meas,n1} + Qoffset - Qoffset_{temp} + Qoffset_{SCTPM} - Qoffset_{unlicensed} * 0.3$$

$$Rn2(\text{neighbour cell1}) = Q_{meas,n2} + Qoffset - Qoffset_{temp} + Qoffset_{SCTPM}$$
[Equation 3]

In Equation 3, $Qoffset_{unlicensed}$ may have a positive number, e.g. 10 dBm. Therefore, the higher RSSI/channel occupancy, the lower cell-ranking.

Similarly, UE may adjust $Qoffset_{frequency}$, instead of $Qoffset_{SCTPM}$, based on the measurement results of RSSI.

For another example, scaling of TimeToTrigger based on the measurement result of RSSI may be as follows. It is assumed that a UE is connected to a cell on unlicensed frequency, and TimeToTrigger is set to 5 ms for all frequencies by the network. When the RSSI measurement results of serving cell is 30 dBm, the UE may perform scaling of TimeToTrigger value based on SF-TTT corresponding to 30 dBm (e.g. 0.6). Therefore, the UE may consider TTT is 3 ms. When the RSSI measurement results of serving cell is 60 dBm, the UE may perform scaling of TimeToTrigger value based on SF-TTT corresponding to 60 dBm (e.g. 0.2). Therefore, the UE may consider TTT is 1 ms. Consequently, the UE can report the measurement results more rapidly.

In step S920, the UE performs the measurement reporting, cell selection and/or cell reselection based on the adjusted value of the parameter. The UE may perform the cell selection/re-selection or measurements procedure based on the adjusted TimeToTrigger, Treselection and/or frequency offset.

According to embodiment of the present invention shown in FIG. 9, if an unlicensed frequency is busy, the UE can deprioritize cells on the frequency by scaling frequency offset based on the measurement results of RSSI and/or channel occupancy when performing cell selection/re-selection. If serving cell or target cell of handover is on unlicensed frequency, measurement report, handover command or handover complete message can be delayed due to LBT procedure. By scaling TimeToTrigger based on the measurement results of RSSI and/or channel occupancy, UE can report the measurement results to network more rapidly, and the chance of handover failure can be reduced.

FIG. 10 shows a UE to implement an embodiment of the present invention. The present invention described above for UE side may be applied to this embodiment.

A UE includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1010 may be configured to perform RSSI measurement and/or channel occupancy measurement for an unlicensed frequency. The processor 1010 may be configured to select a frequency priority for the unlicensed frequency from a mapping table between frequency priorities and RSSIs and/or channel occupancies based on a result of the RSSI measurement and/or the channel occupancy measurement. The processor 1010 may be configured to apply the frequency priority for the unlicensed frequency.

Information on the mapping table may be received from a network. The frequency priority may be selected from the mapping table regardless of a frequency priority configured by a network.

The processor 1010 may be configured to decide whether to measure the unlicensed frequency based on the frequency priority. The processor 1010 may be configured to perform a cell re-selection procedure.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

According to embodiment of the present invention shown in FIG. 10, if an unlicensed frequency is busy, the UE can deprioritize the unlicensed frequency autonomously when the UE performs neighbor cell measurements or cell selection/re-selection. Considering that the channel occupancy can be changed very dynamically, it may be impossible that network re-configures the frequency priority using broadcast signaling whenever it changes. By adjusting network configuration autonomously by the UE, an operation on unlicensed frequency/band/spectrum for NR can be supported efficiently.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:

receiving a configuration for channel occupancy (CO) measurement and received signal strength indicator (RSSI) measurement for an unlicensed frequency;

performing the CO measurement and the RSSI measurement for the unlicensed frequency;

changing a value of a TimeToTrigger for measurement reporting based on a result of the RSSI measurement, wherein the value of the TimeToTrigger becomes smaller based on the result of the RSSI measurement being higher than a RSSI threshold, wherein the TimeToTrigger is a time during which specific criteria for an event needs to be met in order to trigger the measurement reporting;

performing the measurement reporting based on the changed value of the TimeToTrigger;

changing a value of a frequency offset for cell selection or cell reselection based on a result of the CO measurement, and determining a rank of a cell on the unlicensed frequency based on the changed value of the frequency offset, wherein the value of the frequency offset becomes bigger and the rank of the cell becomes lower, based on the result of the CO measurement on the cell being higher than a CO threshold; and performing the cell selection or the cell reselection based on the rank of the cell.

2. The method of claim 1, wherein the method further comprises, changing a value of a cell reselection timer for the cell selection or the cell reselection based on the result of the CO measurement and/or the RSSI measurement; and performing the cell selection or the cell reselection based on the changed value of the cell reselection timer.

3. The method of claim 1, wherein the wireless device is in communication with at least one of a user equipment, a network, and/or autonomous vehicles other than the wireless device.

* * * * *